Figure 1:
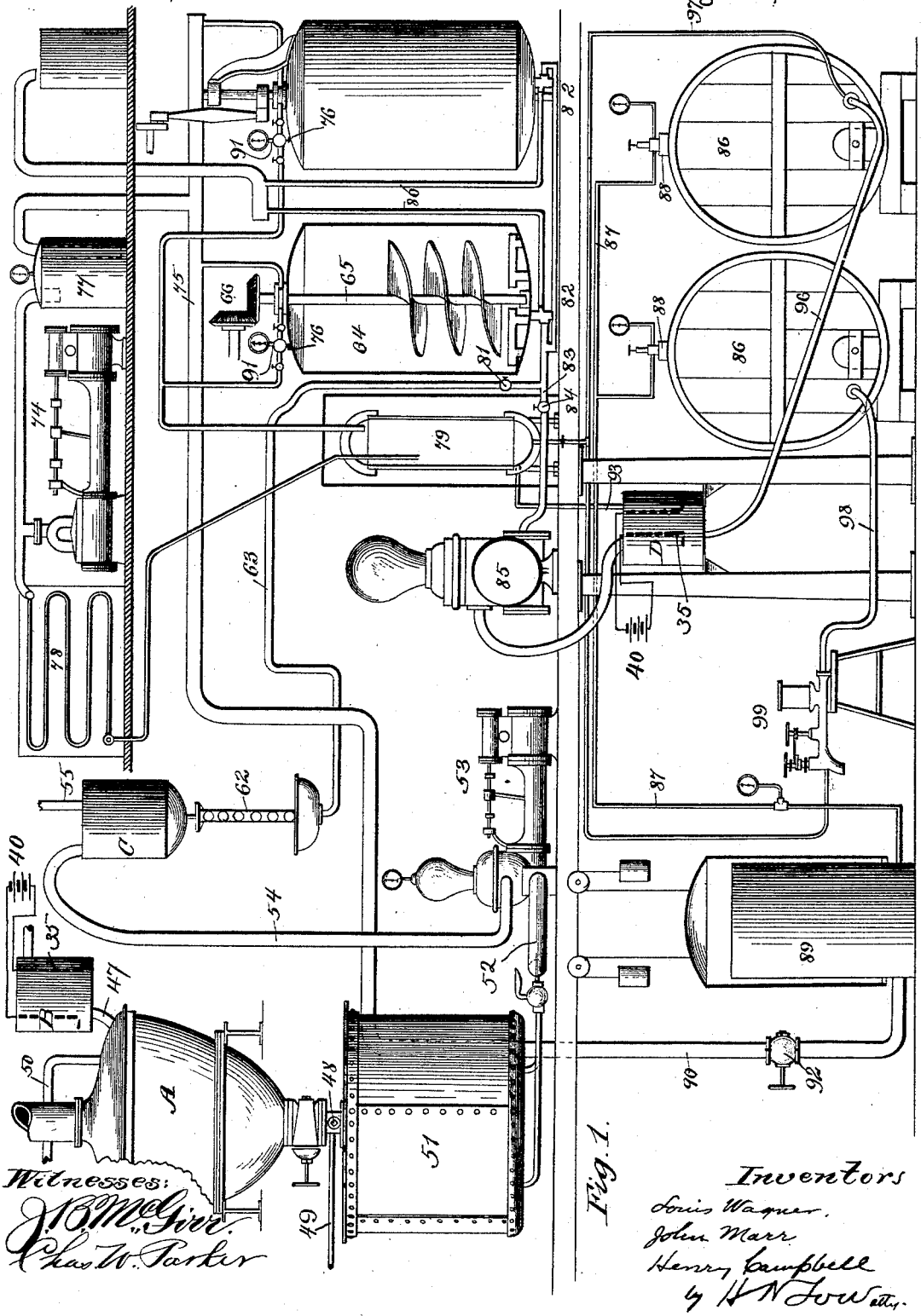

(No Model.) 5 Sheets—Sheet 1.

L. WAGNER, J. MARR & H. CAMPBELL.
PROCESS OF AND APPARATUS FOR THE MANUFACTURE OF BEER, ALE, PORTER, &c.

No. 524,744. Patented Aug. 21, 1894.

Witnesses:
J. B. McGirr.
Chas. W. Parker

Inventors
Louis Wagner,
John Marr,
Henry Campbell
by H. N. Low, atty.

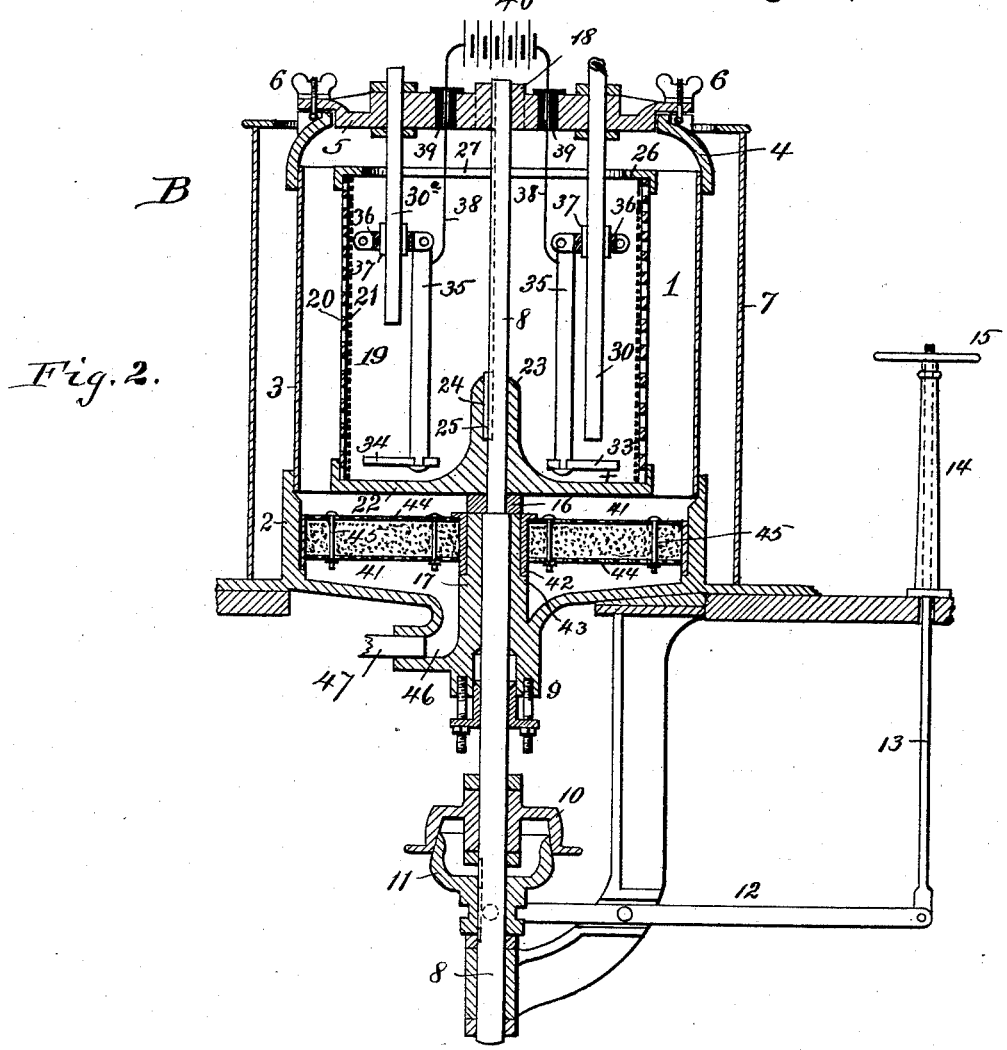

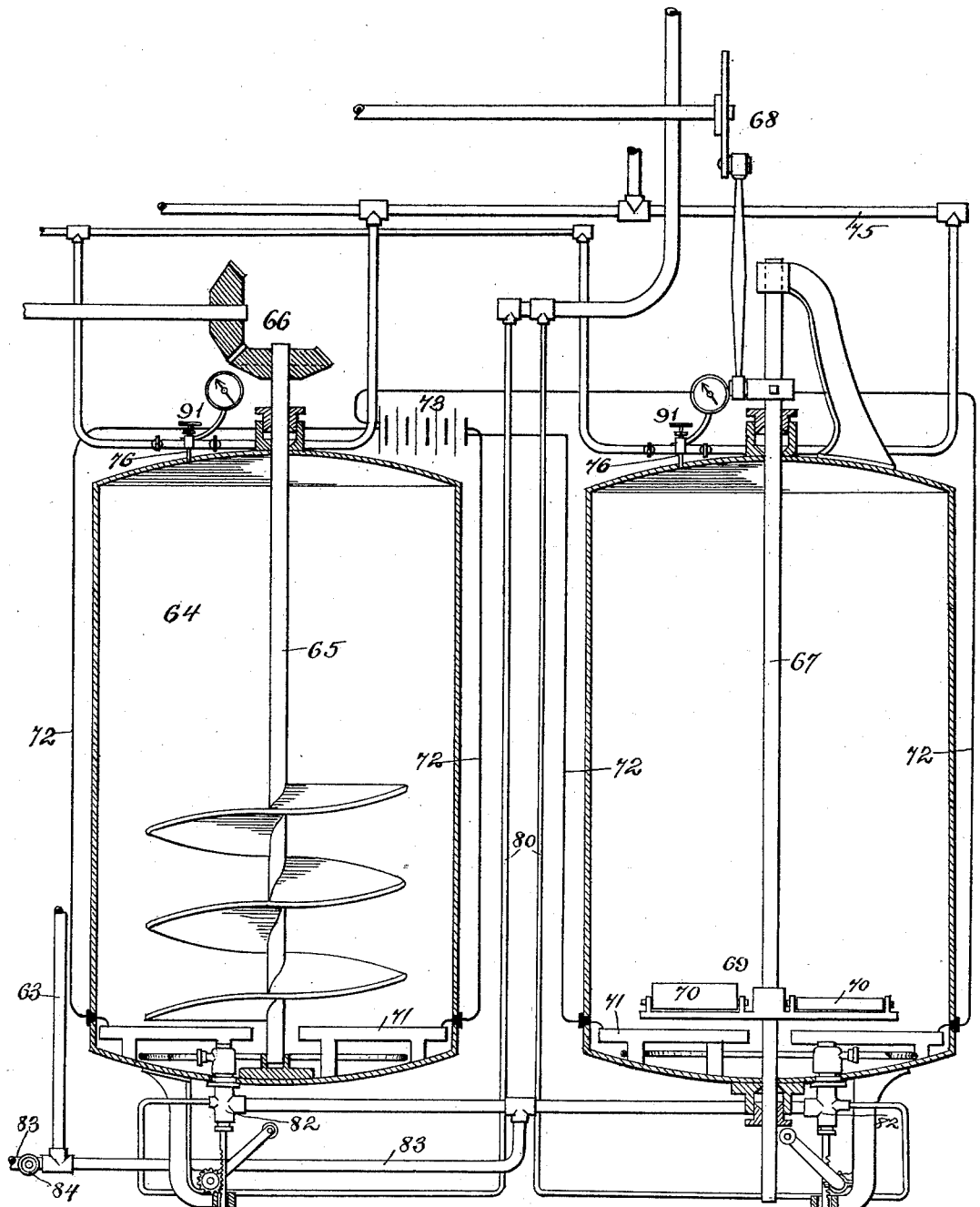

(No Model.) 5 Sheets—Sheet 4.
L. WAGNER, J. MARR & H. CAMPBELL.
PROCESS OF AND APPARATUS FOR THE MANUFACTURE OF BEER, ALE, PORTER, &c.
No. 524,744. Patented Aug. 21, 1894.
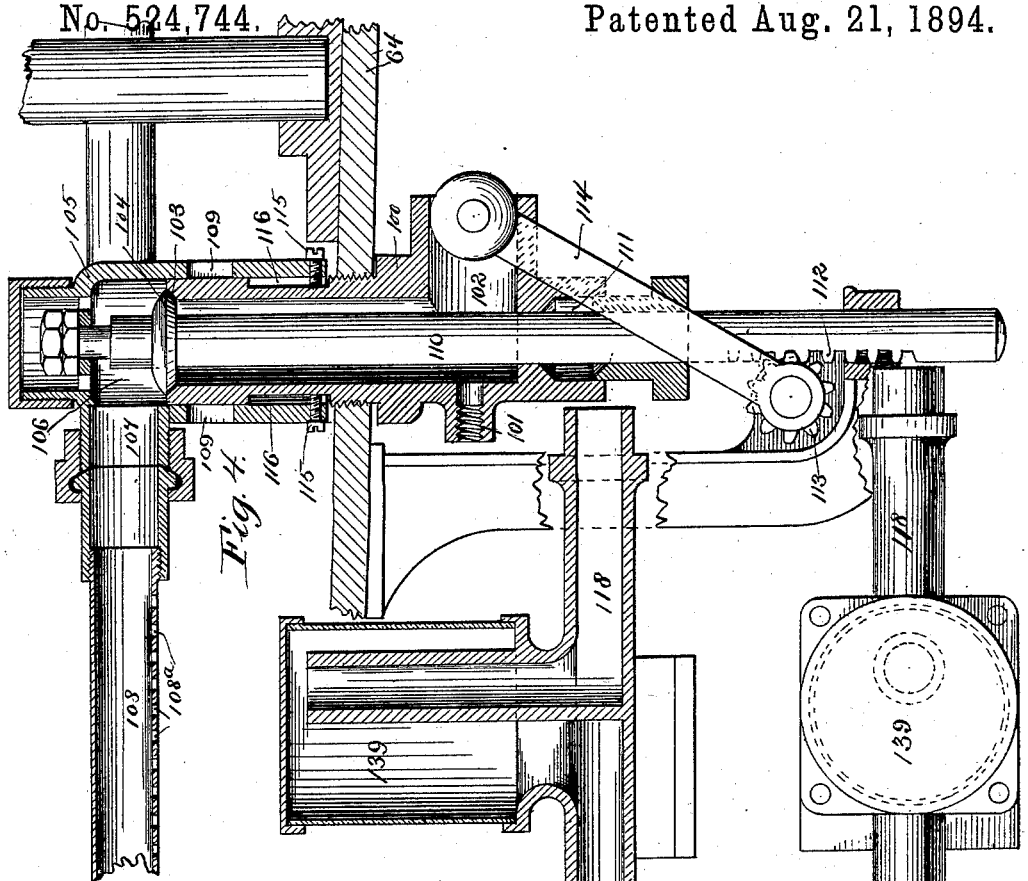
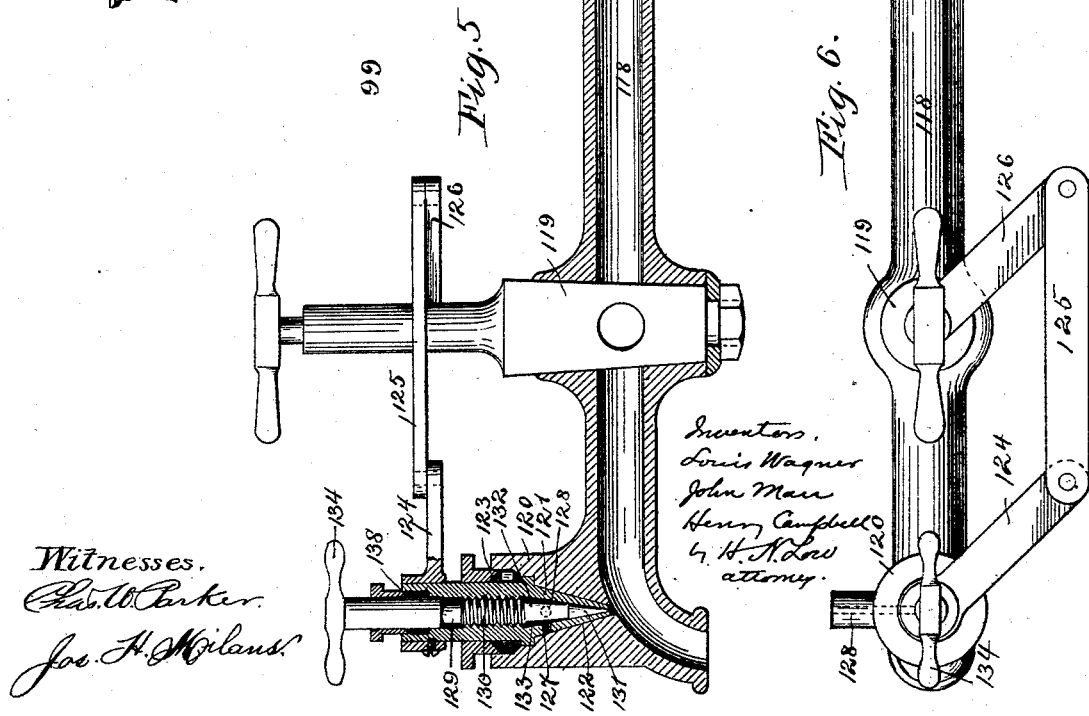

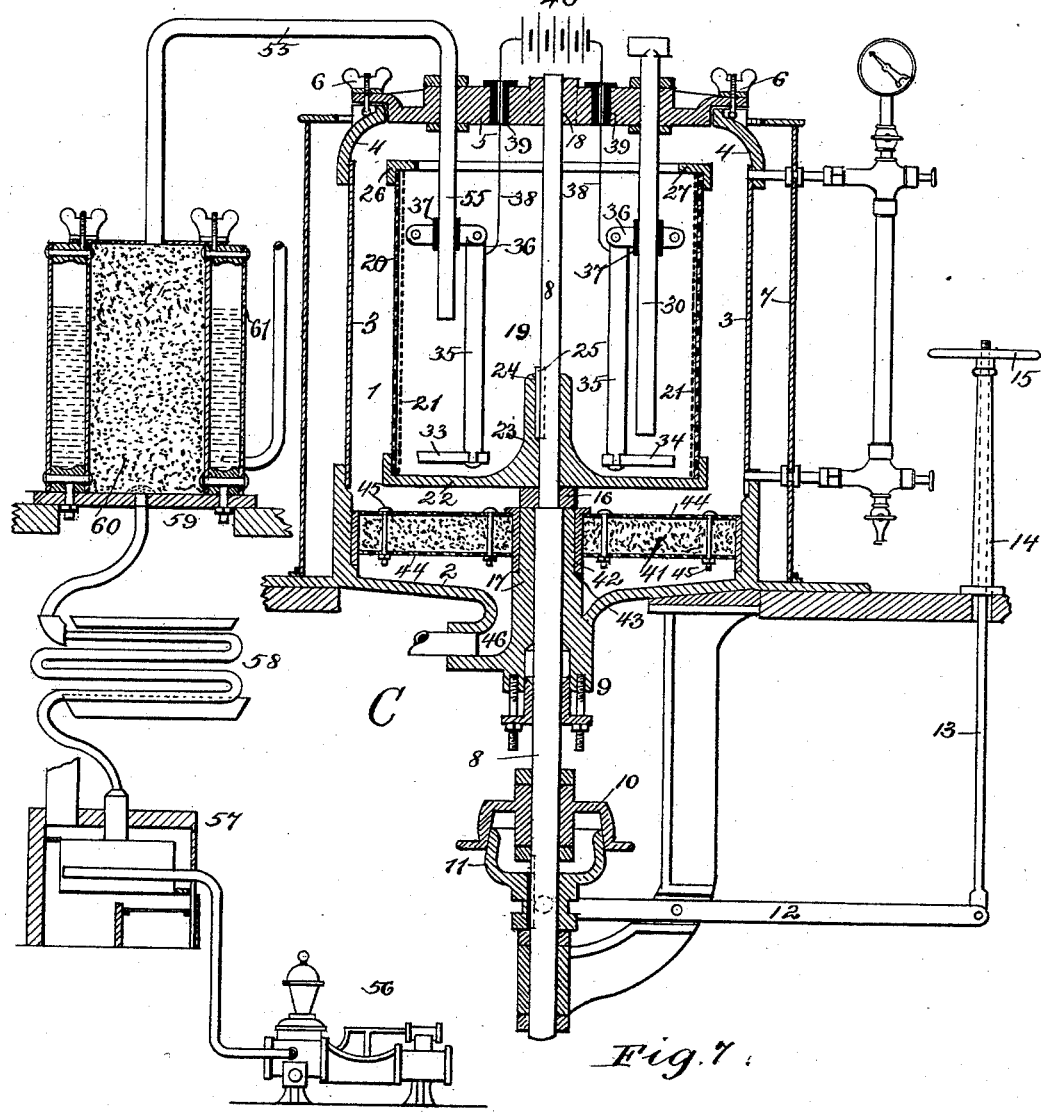

UNITED STATES PATENT OFFICE.

LOUIS WAGNER, JOHN MARR, AND HENRY CAMPBELL, OF BALTIMORE, MARYLAND; SAID CAMPBELL ASSIGNOR TO SAID MARR.

PROCESS OF AND APPARATUS FOR THE MANUFACTURE OF BEER, ALE, PORTER, &c.

SPECIFICATION forming part of Letters Patent No. 524,744, dated August 21, 1894.

Application filed October 11, 1893. Serial No. 487,879. (No model.)

*To all whom it may concern:*

Be it known that we, LOUIS WAGNER, JOHN MARR, and HENRY CAMPBELL, citizens of the United States, residing at Baltimore city, in the State of Maryland, have invented certain new and useful Improvements in Processes of and Apparatus for the Manufacture of Beer, Ale, Porter, &c.; and we do declare the following to be a full, clear, and exact description of the invention, such as will enable others skilled in the art to which it appertains to make and use the same.

In the manufacture of beer much difficulty is experienced from the presence of living organisms in the liquid, which impair the quality of the beverage, and result by reason of a continuous fermentation or growth after the beer is put upon the market, in souring or otherwise spoiling it.

It is one of the principal objects of our present improvement to so treat the beer, and also by preference the water used in its manufacture, as to destroy and remove such organisms as tend to produce the objectionable effect above referred to.

By our mode of manufacture, and by our improved apparatus therefor, we are also enabled to materially hasten the process. Furthermore the procedure looking to the purification of the beer, and the apparatus which we employ therefor, results in the production of a very clear and fine beverage of good flavor, which latter quality the beer will retain by reason of the destruction and removal of those organisms which would tend to ferment and impair the beer as above described.

It will be understood that our improvement may be applied to the manufacture or treatment of other beverages besides lager beer to which our process or any part of our improved apparatus is suited, and we wish our invention to be understood as extending to the manufacture of other beverages, for instance ale, or porter.

In order to make our improvement more clearly understood we have shown in the accompanying drawings means for carrying the same into practical effect, without however intending our invention to be limited in its useful applications, to the particular construction of apparatus which, for the sake of illustration, we have delineated.

In the said drawings Figure 1 is a diagrammatic view on a small scale of our preferred form of apparatus. Fig. 2 is a sectional view on a larger scale of a filter embodying portions of our improvement and adapted for use in the process which constitutes one of the principal features of our invention. Fig. 3 is a sectional view illustrating two forms of fermenting tub also embodying features of our invention and adapted to be used in carrying out the said process. Fig. 4 is a longitudinal sectional view on a larger scale, of the combined air and beer cock of the fermenting vat. Figs. 5 and 6 illustrate respectively by a vertical section and plan, the filling apparatus and cock. Fig. 7 is a vertical sectional view of one of the centrifugal beer filtering and electrolyzing devices.

Referring to the drawings, A indicates the beer kettle in which by any suitable heating means the water for making the mash is first heated. This water is supplied to the kettle A in such condition that all living organisms are perfectly destroyed and the water purified for the purposes hereinbefore mentioned. This is accomplished by means of the centrifugal filtering apparatus indicated at B, and which we will first describe.

Referring especially to Fig. 2, 1 indicates a casing comprising a base 2 preferably formed of cast metal, a cylinder or barrel 3 which may be of sheet metal, a top ring 4 and a removable cover 5, the latter being adapted to be secured when in place by screw clamps 6. This casing for certain purposes of our invention we prefer to make air and gas tight, but for all uses of the apparatus this is not necessary. Exterior to the casing 1 and mounted upon a suitable flange of the base 2 we provide a jacket 7 which may be of sheet metal, and which is adapted to contain a brine or other means of cooling the casing and its contents.

8 is a vertical rotary shaft passing upward through a stuffing box 9 in the center of the base 2 and provided with a loose-pulley 10 adapted to be actuated by a constantly running belt (not shown). Rotary motion is adapted to be communicated to the said shaft at pleasure by means of a clutch member 11 rotating with the shaft and adapted to be moved longitudinally thereon, and which may be caused to engage the pulley 10 by means of a shifting lever 12 operated by a screw-threaded rod 13 which passes through a bearing post 14 and is provided with a hand-wheel 15, which latter also constitutes a screw-threaded nut engaging the end of the said rod and resting upon the bearing post.

The shaft 8 has fixed thereon a supporting collar 16 which rests upon the upper end of a bearing 17 cast with or secured in the base 2. The upper end of the shaft is preferably extended to such height as to find a support in a bearing 18 formed in the cover 5.

19 is a vessel mounted upon the shaft 8 so as to be rotated thereby and situated within the casing 1. Its barrel or cylinder consists of a perforated sheet metal casing 20, within which is supported a fine wire or other sieve or strainer 21. The said parts 20 and 21 are secured to and supported by a base plate 22 of cast metal, the center of which is formed with a hub 23 having a groove 24. This hub fits over the shaft 8 so that the plate 22 rests upon the collar 16 and the said groove 24 is engaged by a rib 25 secured to the shaft. At their upper ends the parts 20 and 21 are provided with a strengthening ring 26 having an inwardly extending retaining flange 27.

The pipe for the introduction of water within the casing is indicated at 30 which passes through the cover 5 to a point near the bottom of and within the vessel 19.

33 and 34 indicate positive and negative electrodes situated within the casing 1 and preferably within and at or near the bottom of the vessel 19. These electrodes are supported by conductors 35, and the latter by clamps 36 provided with insulating bushings 37 and secured upon the pipe 30 and support 30ª. 38 indicates insulated conductors passing to the conductors 35 through the cover 5, in which latter they are surrounded by insulating plugs 39. These conductors receive a suitable current of electricity, say one of one hundred volts, from any suitable generator, which latter is indicated diagrammatically at 40.

41 is a filter or strainer bed situated in the bottom of the casing 1. By preference we provide said bed with a central sleeve 42 adapted to be passed over the upper end of the bearing 17 and to rest upon a shoulder 43 thereof. The outer edge of said bed rests upon suitable supports on the base 2. The filter bed is in the form of a flat cylinder or ring, the upper and lower faces of which are formed by perforated metal plates 44 held together by bolts 45 or other suitable means. Between the plate 44 the filtering material is secured, consisting preferably of sponge cut into small pieces and packed tightly together but sufficiently open to permit the free passage of the liquid to be operated upon.

The exit from the casing 1 is formed through the base 2 at 46, and all the liquid admitted by the pipe 30 is compelled to pass through the filtering bed 41 before it reaches said exit.

By removing the cover 5 with its supported parts, and the vessel 19, the filter bed 41 can be detached and its contained filtering material washed and cleaned.

The purified water from the filtering apparatus B passes to the kettle A through the pipe 47. After being heated to the proper degree, it is caused to pass, by properly turning a three-way cock 48, through the pipe 49 to the mash tub. The latter is not shown, forming no necessary part of our present improvement. The usual operations having been performed in the mash tub, the wort is returned to the kettle A by the pipe 50, where it is boiled in the usual manner. After this operation the liquid is caused to pass by the said three-way cock 48 into the hop jack 51. The hops are added in the kettle A at the end of the boiling operation, or in the hop jack 51 as may be preferred. The unfermented beer is conducted from the hop jack by pipe 52, leaving behind it the hops and other solids, excepting small particles.

By a pump 53, with which the pipe or pipes 52 communicate the beer is forced upward through the conduit 54 to the centrifugal filtering apparatus C. (Fig. 7.) In its general construction the latter is similar to the apparatus B already described. It has however certain additional features. The object of treating the beer by the filtering apparatus C is to destroy in it and eliminate from it all organisms and other solids. This part of the operation is performed in a similar manner to that described in connection with the apparatus B. In order however to prevent the foaming of the beer from its rapid and forcible agitation, we provide means for applying an air pressure of considerable amount to the surface of the liquid in the filtering apparatus C. To this end an air pipe 55 is inserted through the cover of the filter and is supplied with air under pressure by any suitable means, such as a pump 56. We however prefer to sterilize the air so supplied to the surface of the beer, and for this purpose cause it to pass from the said pump or compressor through a heating furnace 57 where it is raised to a temperature sufficiently high to insure the destruction of all organisms. From said furnace the air is conducted through a cooling coil 58 and thence through an air filtering apparatus 59, the latter serving to arrest all dust or solid particles. The filtering material which is shown at 60 may consist of cotton or sponge, or other suitable substance and is preferably surrounded by a casing 61 containing brine or other cooling means. On leaving the filtering apparatus C the beer passes by gravity through a cooling coil 62, and thence by a pipe 63 to the fermenting vat or vats 64. Before the entrance of the beer the said fermenting vats are charged with yeast in the usual manner, and the contents of the vats for several hours after the introduction of the beer is agitated in such manner as to lift the yeast from the bottom of the vat or vats and elevate it in the liquid. This we may effect by a vertical rotary shaft 65 mounted in the vat and provided with a conveying screw or blade, the said shaft being extended through the top of the vat and provided with a driving mechanism 66. We have also illustrated another mechanism for the purpose of elevating the yeast in the beer, consisting of a vertical dasher rod 67 adapted to be reciprocated by a suitable mechanism 68. At the lower end of the rod 67 is carried a dasher 69 provided with blades or paddles 70 which are adapted to lie horizontal or nearly so as the dasher is elevated, and to turn in a direction edgewise or parallel with their line of movement as the dasher is depressed. After the yeast has been thoroughly incorporated with the beer, which will be accomplished in a few hours of the operation of the said elevating mechanism, the contents of the fermenting vat is allowed to rest quietly for the necessary period of fermentation, say from four to six days.

In order to promote the fermentation the fermenting vats are provided with electrodes 71 situated by preference at or near the bottom of the vat with which suitable electric conductors 72 running from a generator 73, are connected. In order to still further promote fermentation and hasten the process, and also to collect the carbonic acid gas which is the product of the said fermentation, an exhausting pump 74 is connected by a pipe 75 with the top of the fermenting vat. The passage of the gas from the fermenting vats to the said pump is controlled by the cock 76. Before reaching the pump 74 the gas is caused to pass through a liquid purifier 77 of any usual construction and after leaving the said pump it enters a cooling coil 78 which is adapted to withstand a high degree of pressure. The latter communicates at its lower end with a receiver 79 preferably surrounded by a casing adapted to contain brine or other cooling means. The said receiver should be made of sufficient strength as to permit the gas to be compressed therein to such degree as to become liquid.

In order to promote fermentation of the beer in the vats 64, the latter are provided with air pipes 80 entering at or near the bottom of the vat and adapted to deliver from time to time as may be desired a quantity of air which will pass upward through the fermenting beer. Air is supplied to the pipes 80 from the sterilizing apparatus already described, and shown at 57, 58 and 59. The fermentation of the beer having been completed and it being desired to remove the same from the vat 64, and the cock 81 in the pipe 63 being closed, the cock 82 is opened to permit the beer to flow from the vat. Preferably the latter cock will be made a three-way valve of suitable construction so that the first beer drawn out which usually contains a considerable amount of yeast or solid matter may be received in a pail or other receptacle. The pipe 63 has communicating with it a branch 83 controlled by a cock 84, through which pipe the beer is adapted to flow by gravity, or by the action of a pump 85 to a filtering apparatus D of similar construction to that already described at C. In this filtering apparatus the beer is finally purified and all remaining living organisms destroyed. It is then either conducted directly to a carbonizing apparatus or to suitable storage tanks 86. In these latter tanks or casks the beer may be permitted to ferment in the usual way, these receptacles being connected with each other by a pipe 87 and bunging devices 88 to distribute and equalize the carbonic acid pressure in the several casks. Any excess of carbonic acid is adapted to be collected and utilized by a receiver 89 with which the said pipe 87 is connected. This receiver is also connected by a pipe 90 with the pipe 75 leading to the compressing apparatus by means of which the gas collected in the tank 89 may be transferred or stored either in gaseous or liquid form in the receiver 79.

We may here remark that we have provided for collecting the gaseous products of fermentation from the vat 64 without the use of an exhausting apparatus, by means of bunging devices 91 connected with the pipe 75. Therefore if the pump or compressor 74 be not operated to produce a vacuum the excess of carbonic acid gas will pass through the pipe 75 and thence by way of the pipe 90, the valve 92 of the latter being opened for the purpose, into the receiver 89.

In the course of its passage through the filtering apparatus D the beer may be charged with carbonic acid and vitalized, so as to be ready for immediate sale and consumption, and for this purpose the said apparatus may be connected by a pipe 93 with the carbonic acid receiver 79. The carbonic acid may however be applied to the beer as it is delivered from the filtering apparatus by the pipe 96 to the casks 86 and for this purpose we provide a pipe 97 leading from the said receiver 79 and connected with the cask 86 at the point where it receives the beer. Any excess of carbonic acid thus supplied to the beer will be distributed by the bunging devices 88 and the aggregate excess will be accummulated in the receiver 89 without any waste. The pipe 96, it will be understood, is flexible and adapted to be connected with whatever cask is to be charged with beer.

The beer may not receive its charge of carbonic acid until it is delivered to the small cask in which it is transported for sale. In the latter case the receiver 79 is connected by a branch pipe 98 with the filling apparatus or cock 99.

Referring to Fig. 4, in which is illustrated on a larger scale the cock 82, 100 indicates a pipe or fitting adapted to be screwed into the bottom of the tank 64 and having the air inlet duct 101 and beer inlet and outlet duct 102. The upper end of this pipe is provided with a valve seat 103 on which bears the valve 104. By means of a hood 105, adapted to slide longitudinally on the upper end of the pipe 100, a chamber 106 is formed above the valve 104. From this chamber leads a duct 107 to which is coupled a pipe 108, perforated on its under side at 108ª which pipe extends around inside of, and preferably near the bottom of the tank 64. In the lower portion of the hood 105, are formed ports 109 which are normally closed by the upper portion of the pipe 100 which fits within this portion of the hood. The valve 104 is opened or closed by means of a rod 110 secured thereto and extending nearly to the top of the hood, and passing through a stuffing box 111 in the lower extremity of the pipe 100. Said rod is provided, external to the stuffing box, with a rack 112. With this toothed rack meshes a gear 113 the axis of which is mounted preferably on a bracket secured to the tank 64, and actuated by a crank 114 or any other suitable means.

When it is desired to supply air to the beer in the tank 64, the rod 110 and valve 104 carried thereby are raised slightly by means of the crank, and gear 113, but not sufficiently far to cause the extension of the rod 110 to abut against the top of the hood. Thus air passes from a pump through the duct 101, the pipe 100, past the open valve 104 and into the beer in the tank 64 through the perforations in the bottom of the pipe 108.

When the beer is to be drawn from the tank the rod 110 is raised sufficiently high to cause its extension to abut against the bearing and lift the latter thereby bringing the ports 109 above the top of the pipe 100 and permitting the beer to flow through said ports into the pipe 100, and thence through the duct 102 to a conduit, or vessel to be filled.

The longitudinal movement of the hood 105 is limited (to prevent its displacement from the pipe 100) by means of set screws 115, sliding in grooves or ways 116 having upper shoulders with which the set screws come in contact.

118 (Figs. 5 and 6) is the main conduit in the filling apparatus 99, through which the beer flows from the pipe 98, to which the apparatus is coupled, to a conical plug valve 119, controlling the flow of beer from the apparatus 99. As above stated it may be desirable to supply carbonic acid to the beer as it passes through the filling apparatus, and to accomplish this result we provide a valve situated in a boss 120 near the nozzle of the filling apparatus 99.

121 represents a centrally bored conical plug valve fitting in a conical bearing seat 122 in the boss 120.

123 is a stuffing box, in the boss 120 through which the stem of the hollow plug valve 121 passes. To this stem is detachably secured a horizontal arm 124 connected by a link 125 with a similar arm 126 on the stem of the plug valve 119. It will be seen from this construction that when the valve 119 is turned the valve 121 will be correspondingly turned. In the valve 121 is a hole 127 adapted to register when the valve is open with a duct 128 communicating with the gas supply pipe.

129 is a spindle provided with a screw-threaded portion 130 which engages with a corresponding screw thread on the inner face of the hollow plug 121. Between the screw threaded portion 130 of the spindle and a lower conical point 131 fitting gas-tight in the lower conical portion of the bore in the plug 121, is a portion 132 adjacent to the hole 127, of smaller diameter than that portion of the bore in the plug 121 which is adjacent thereto. The carbonic acid is admitted to the space 133 thus formed through the hole 127 when the latter registers with the duct 128, whence it is supplied in any desired quantity to the beer in the cock 99, by turning the handle 134 on the stem of the spindle 129 which raises or lowers the point 131.

138 is a stuffing box encircling the stem of the spindle 129 to prevent the escape of any carbonic acid.

By our device we obtain a very fine regulation of the flow of the carbonic acid.

As the beer flows through the filling apparatus it may be caused to pass through a glass cup or chamber 139 forming a part of the conduit 118 so that the beer is presented to view before it is drawn off.

What we claim is—

1. The herein described process for the manufacture of beer which consists in first filtering and subjecting to the action of an electrical current the water for the mash, then making the mash and boiling the worts, then filtering the beer under air or gas pressure and cooling it, then fermenting the same under a vacuum, abstracting the carbonic acid gas and admitting a limited amount of air, the beer being stirred and the yeast lifted and mixed therein during the first part of the period of fermentation, and then purifying the fermented beer under carbonic acid gas pressure by filtration and the action of an electrical current and charging it with carbonic acid, substantially as set forth.

2. In the manufacture of beer the herein described process, which consists in fermenting the beer, then subjecting it to the simultaneous action of centrifugal and electrical forces, and then charging it with carbonic acid, substantially as set forth.

3. In the manufacture of beer, the herein described process, which consists in fermenting the beer under a vacuum or partial vacuum, then subjecting it simultaneously to the action of an electrical current and centrifugal force and filtering it, and then charging it with carbonic acid, substantially as set forth.

4. In the manufacture of beer, the herein described process of purification of the same which consists in filtering it by centrifugal force in the presence of carbonic acid gas and at the same time subjecting it to the action of an electrical current, substantially as set forth.

5. The herein described apparatus for the manufacture of beer which consists of the combination of the kettle, means for supplying water thereto provided with a filter having electrodes as described, a second filter adapted to receive the boiled beer, means for cooling the beer, a closed fermenting tub, mechanism in the latter for elevating the yeast, an air pump connected with the tub for producing a vacuum therein and abstracting the carbonic acid gas, a receiver for the latter, a filter provided with electrodes and connected with the tub for purifying the fermented beer, and a pipe leading to the latter filter for supplying carbonic acid gas, substantially as set forth.

6. The combination with the closed fermenting tub, of an air supply at the lower part of the same, an elevating mechanism within the tub for raising the yeast during the first period of fermentation, electrodes within the tub, and means for supplying an electrical current thereto substantially as set forth.

7. The combination with the fermenting tub, of a centrifugal filtering device having electrodes as described and means for supplying carbonic acid gas to the filter, substantially as set forth.

8. The combination with the closed fermenting tub, of a pump connected therewith for producing a vacuum and abstracting the carbonic acid gas, a filter connected with the tub and having electrodes as described, and conduits for delivering said gas to the filter, substantially as set forth.

9. The combination of the centrifugal filter having electrodes as described, means for supplying beer thereto and for rotating it, an air sterilizing apparatus, means for supplying air therefrom to said filter, a closed fermenting tub connected with the filter, a pump for exhausting air and carbonic acid from the tub and producing a practical vacuum, and a pipe leading from said air sterilizing apparatus to the lower portion of said tub, substantially as set forth.

In testimony whereof we affix our signatures in the presence of two witnesses.

LOUIS WAGNER.
JOHN MARR.
HENRY CAMPBELL.

Witnesses:
S. G. HOPKINS,
H. N. LOW.